United States Patent
Kronegger et al.

(10) Patent No.: US 8,866,037 B2
(45) Date of Patent: Oct. 21, 2014

(54) SPOT WELDING TONGS INCLUDING A COMPENSATION UNIT EQUIPPED WITH A CURVED CONNECTOR ELEMENT

(75) Inventors: Wolf Kronegger, Vorchdorf (AT); Robert Schiefermüller, Buchkirchen (AT); Walter Stieglbauer, Manning (AT)

(73) Assignee: Fronius International GmbH, Pettenbach (AT)

( * ) Notice: Subject to any disclaimer, the term of this patent is extended or adjusted under 35 U.S.C. 154(b) by 1179 days.

(21) Appl. No.: 11/990,313

(22) PCT Filed: Aug. 18, 2006

(86) PCT No.: PCT/AT2006/000345
§ 371 (c)(1),
(2), (4) Date: Feb. 11, 2008

(87) PCT Pub. No.: WO2007/022553
PCT Pub. Date: Mar. 1, 2007

(65) Prior Publication Data
US 2009/0050607 A1    Feb. 26, 2009

(30) Foreign Application Priority Data
Aug. 23, 2005   (AT) ................. A 1392/2005

(51) Int. Cl.
*B23K 11/10* (2006.01)
*B23K 11/31* (2006.01)

(52) U.S. Cl.
CPC ............ *B23K 11/314* (2013.01); *B23K 11/317* (2013.01)
USPC ............................................ 219/90; 219/89

(58) Field of Classification Search
USPC .......... 219/86.25, 86.32, 86.33, 86.41, 86.51, 219/86.7, 90, 120
See application file for complete search history.

(56) References Cited

U.S. PATENT DOCUMENTS 4,159,866 A * 7/1979 Wunsch et al. ............... 359/876
5,321,225 A * 6/1994 Boyer ............................ 219/89

(Continued)

FOREIGN PATENT DOCUMENTS

DE    202 14 970    1/2004
DE    103 44 056    4/2005

(Continued)

OTHER PUBLICATIONS

International Search Report.

(Continued)

*Primary Examiner* — Brian Jennison
(74) *Attorney, Agent, or Firm* — Collard & Roe, P.C.

(57) ABSTRACT

The invention relates to spot welding tongs with tong compensation, including a tong base body (4), two tong arms (6, 7) and a compensation unit (17) movably connecting one of the tong arms (6, 7) with the tong base body (4) and designed to convert a rotational movement into a linear movement, wherein the compensation unit (17) is composed of a drive unit (18) and a connector element (19), and the connector element (19) is eccentrically and movably fastened to an eccentric disc (23) fastened to the drive unit (18). In order to provide such spot welding tongs (1) with a compensation unit, which converts the rational movement into a linear movement, the connector element (19) is designed to be curved in an end region.

19 Claims, 7 Drawing Sheets

(56) References Cited

U.S. PATENT DOCUMENTS

| | | | | |
|---|---|---|---|---|
| 5,581,138 A | * | 12/1996 | Tukamoto et al. | 310/83 |
| 5,750,953 A | * | 5/1998 | Sato et al. | 219/90 |
| 5,928,531 A | * | 7/1999 | Sato et al. | 219/86.25 |
| 2004/0195213 A1 | * | 10/2004 | Angel | 219/86.25 |

FOREIGN PATENT DOCUMENTS

| | | |
|---|---|---|
| GB | 2 279 423 | 1/1995 |
| JP | 2002-224847 | 2/1998 |
| JP | 11-285841 | 10/1999 |
| JP | 2001-25880 | 4/2000 |
| JP | 2002-96177 | 9/2000 |
| WO | WO 02/078892 | 10/2002 |

OTHER PUBLICATIONS

Japanese Office Action of Feb. 22, 2011 and English translation.
Japanese Office Action dated Dec. 6, 2011 in Japanese Patent No. 2008-527259 with English translation.

* cited by examiner

SPOT WELDING TONGS INCLUDING A COMPENSATION UNIT EQUIPPED WITH A CURVED CONNECTOR ELEMENT

CROSS REFERENCE TO RELATED APPLICATIONS

Applicants claim priority under 35 U.S.C. §119 of Austrian Application No. 1392/2005 filed Aug. 23, 2005. Applicants also claim priority under 35 U.S.C. §365 of PCT/AT2006/000345 filed Aug. 18, 2006. The international application under PCT article 21(2) was not published in English.

The invention relates to spot welding tongs with tong compensation, including a tong base body, two tong arms and a compensation unit movably connecting one of the tong arms with the tong base body and designed to convert a rotational movement into a linear movement, wherein the compensation unit is composed of a drive unit and a connector element, and the connector element is eccentrically and movably fastened to an eccentric disc fastened to the drive unit.

Spot welding tongs of this type are, for instance, known from WO 02/078892 A1, wherein the compensation movement is accomplished through a drive unit connected with a connector element via an eccentric tappet, by converting the rotational movement of the drive unit into a longitudinal movement of the connector element.

From DE 103 44 056 A1 spot welding tongs with a compensation unit can also be taken, in which a compensation drive is connected with the articulation levers of the welding tongs via an eccentric drive. The spot welding tongs, moreover, are designed such that a separate compensation drive can be obviated by the latter being replaced with simple mechanical means.

Compensation units converting rotational movements into linear movements via threads are known from the prior art. From DE 202 14 970 U1, robot welding tongs including a compensation device are, for instance, known, in which a spindle is driven by an electric motor and the linear movement resulting therefrom is used as a balancing movement for the tong arms of welding tongs. Since the spindle in that case is self-locking, the compensation unit is designed to comprise elastic elements like springs so as to enable the suspension of the compensation movement.

It is, however, disadvantageous that such a design of the compensation unit requires additional elastic elements for suspension the compensation movement. This involves elevated structural expenditures and maintenance expenditures. Moreover, such spindle drives entail an increased number of thermal problems, which are due to high frictional losses caused by the spindle drive.

The object of the invention resides in providing spot welding tongs with tong compensation, in which said compensation unit converts the rotational movement of an electric motor into a linear movement, i.e. compensation movement, of a tong arm in a simple manner. The drawbacks of the prior art are to be avoided or at least reduced.

The object of the invention is achieved in that the connector element is designed to be curved in an end region. Such a design of the connector element of the compensation unit ensures the optimum conversion of the rotational movement of the drive unit into a linear movement. It offers the advantage that the conversion of the rotational movement into a linear movement is effected by a crank construction. It is likewise advantageous that the structure is realized in a simple and non-complex manner and is, therefore, easy to maintain.

In an advantageous manner, the configuration of the compensation unit according to the invention as defined in claims 2 to 6 prevents a self-locking action of the compensation unit such that no additional elements with resilient effects will be required.

The measure that the drive unit is arranged on the base body of the tong or on one of the tong arms in an advantageous manner offers the option of a flexible arrangement of the drive unit or compensation unit, respectively.

In an advantageous manner, the measuring element provided on the connector element ensures that an exact, force-related control is achieved for a precisely defined compensation force.

The present invention will be explained in more detail by way of the attached schematic drawings. Therein:

FIG. 1 in a schematic and simplified illustration depicts spot welding tongs in its starting position, including a compensation unit according to the invention;

Figure 5:
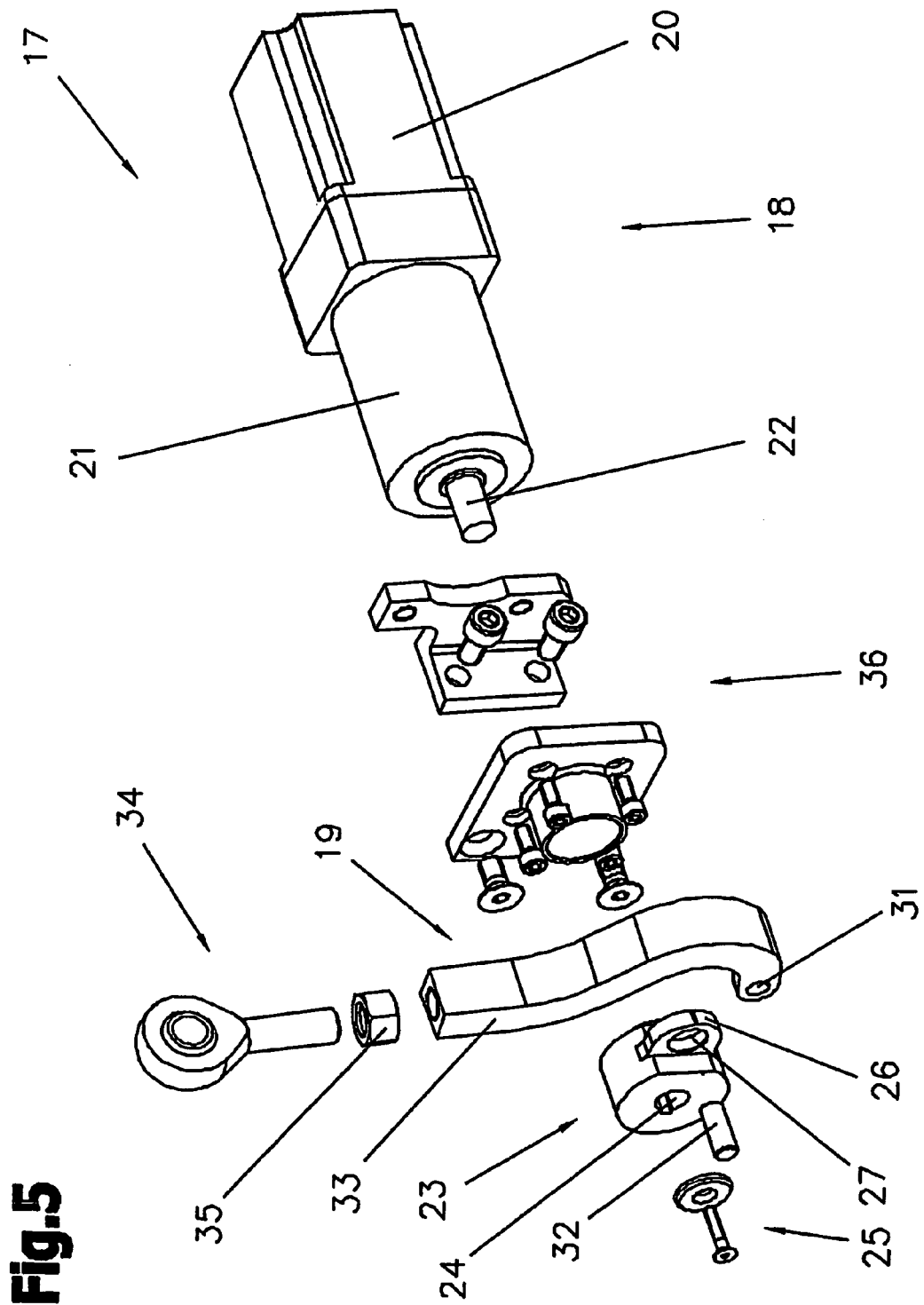
Figure 6:
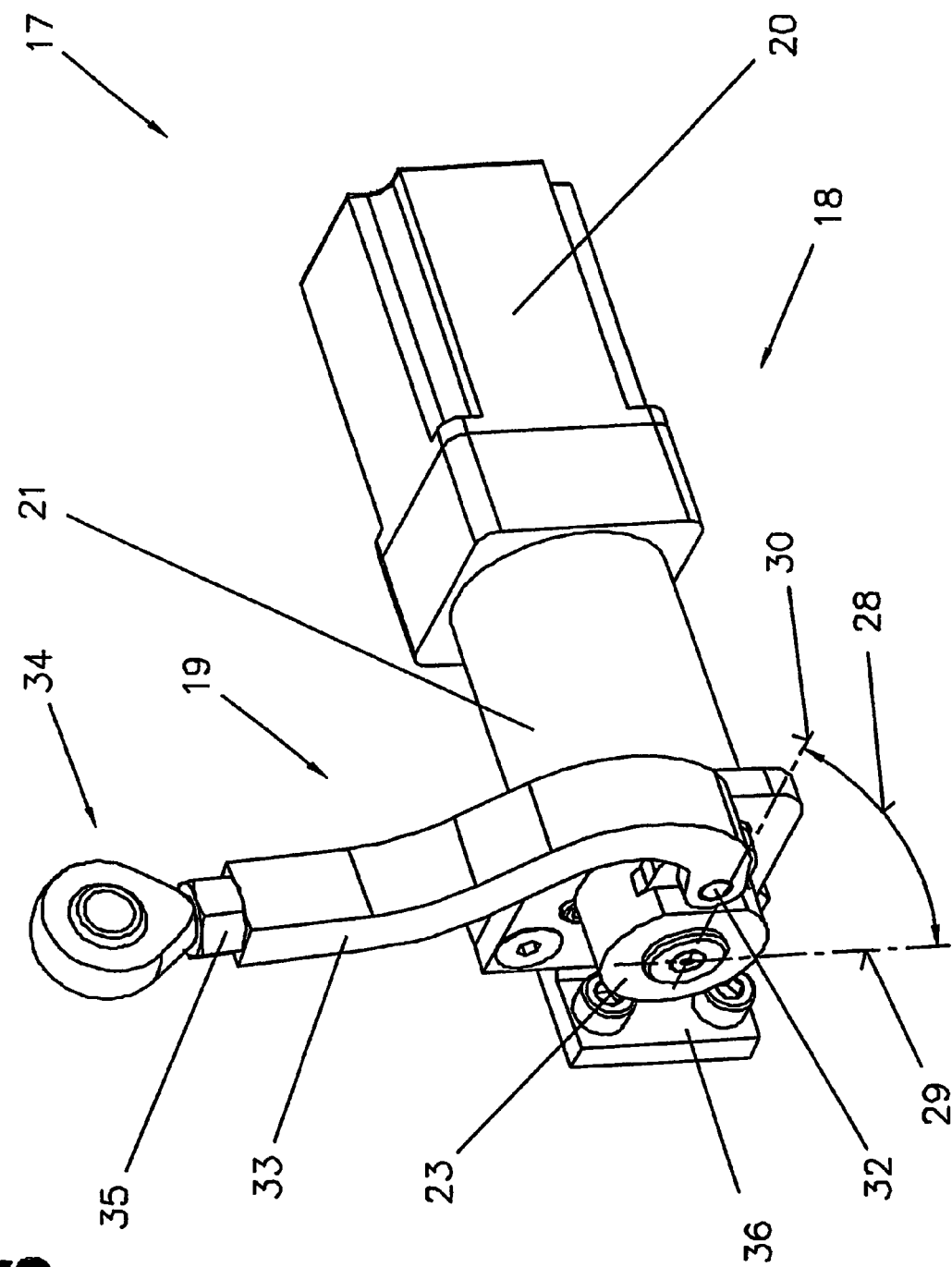
Figure 7:
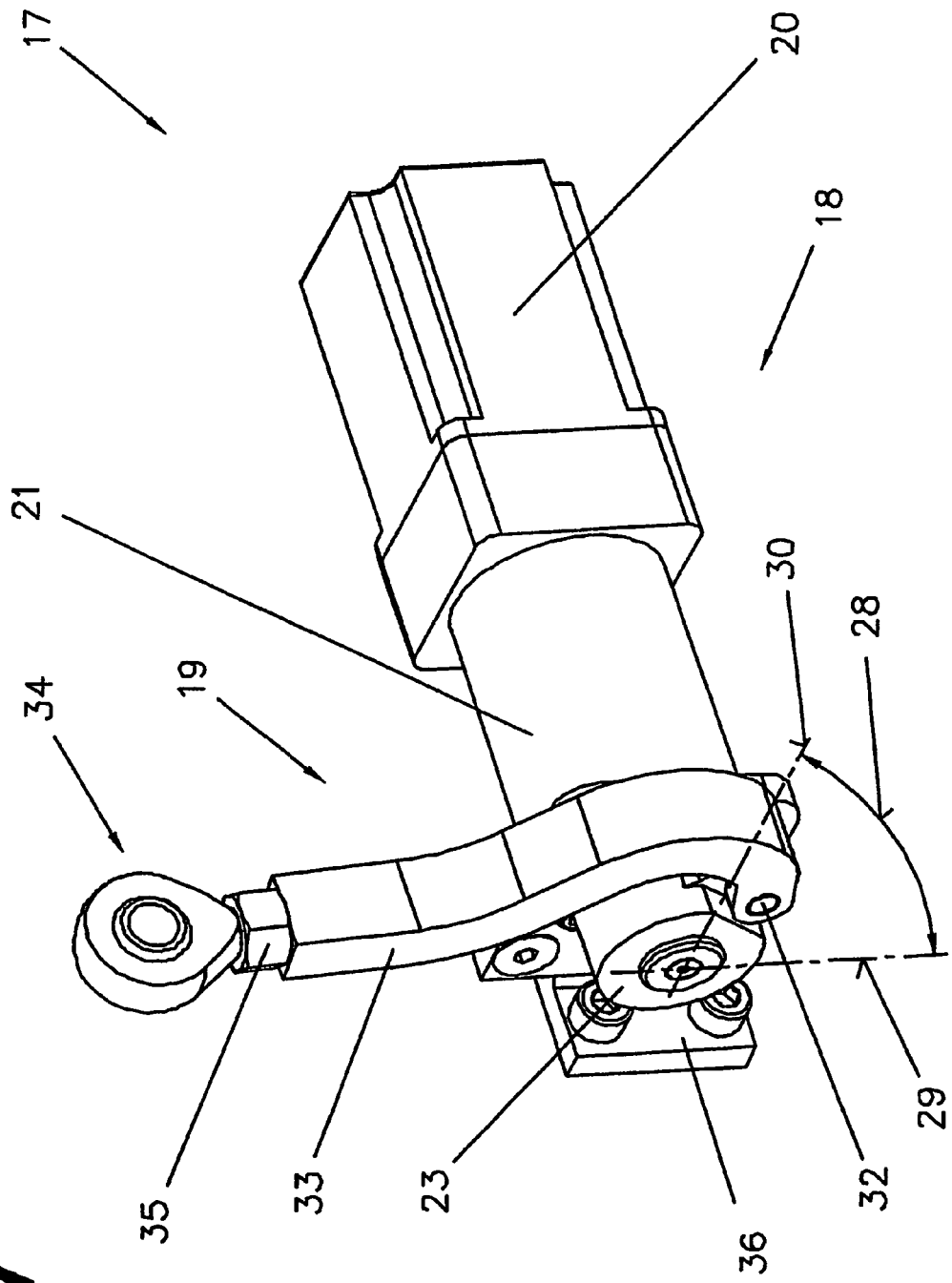

FIG. 5 schematically illustrates the structure of the compensation unit according to the invention;

FIG. 6 depicts the compensation unit according to FIG. 5 in a position of the compensation movement; and FIG. 7 depicts the compensation unit according to FIG. 5 in another position of the compensation movement.

Figure 1:
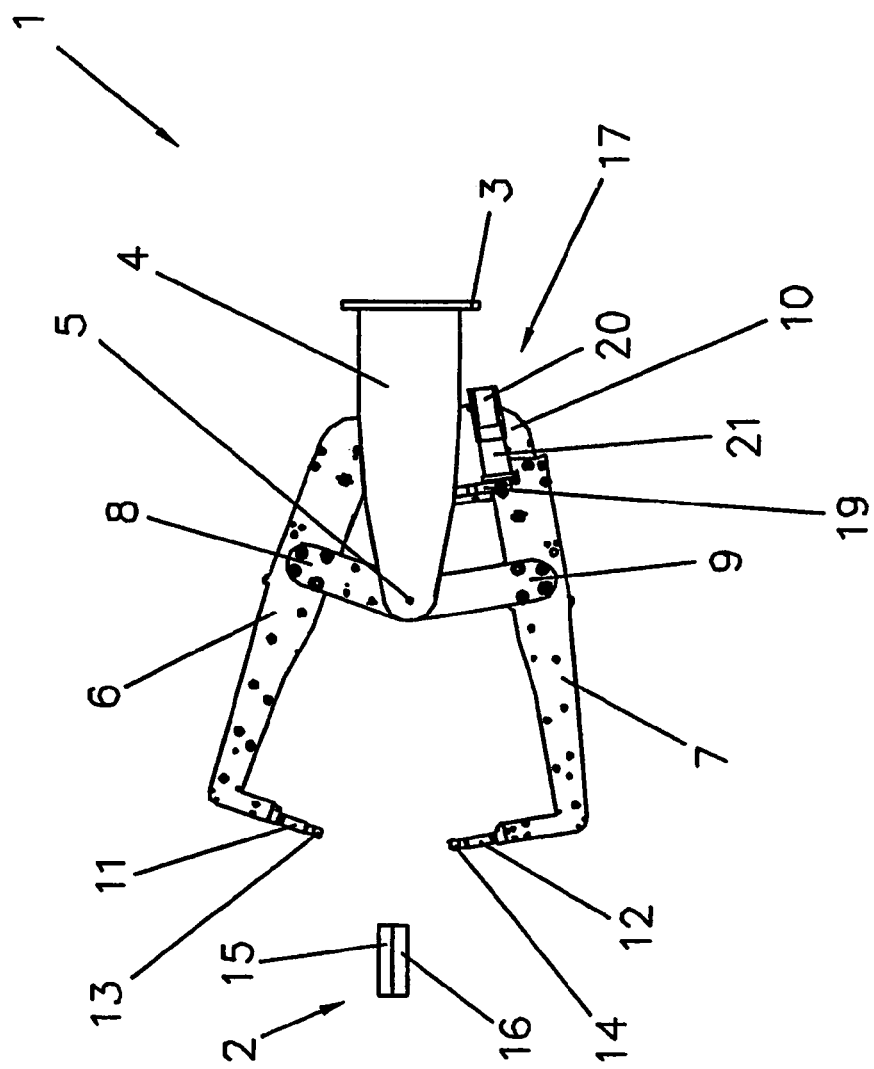

FIG. 1 depicts spot welding tongs 1 for the resistance welding of workpieces 2, wherein the spot welding tongs 1 are preferably manipulated by a robot. Its fixation is realized via a robot flange 3 which is attached to the end of a tong base body 4. The other end of the tong base body 4 is configured such that a pin 5 forms an axis of rotation for the whole spot welding tongs 1, about which a tong arm 6 and a further tong arm 7 are rotationally mounted on the pin 5 via pivot arms 8 and 9, respectively. Between the pin 5 and the robot flange 3, the tong arms 6, 7 are connected with each other via a main drive 10. Thus, so-called X-spot welding tongs 1 are formed. In the front regions of the tong arms 6, 7 and, in particular, on their front ends, an electrode holder 11, 12 is each arranged to hold an electrode 13, 14, respectively.

Figure 2:
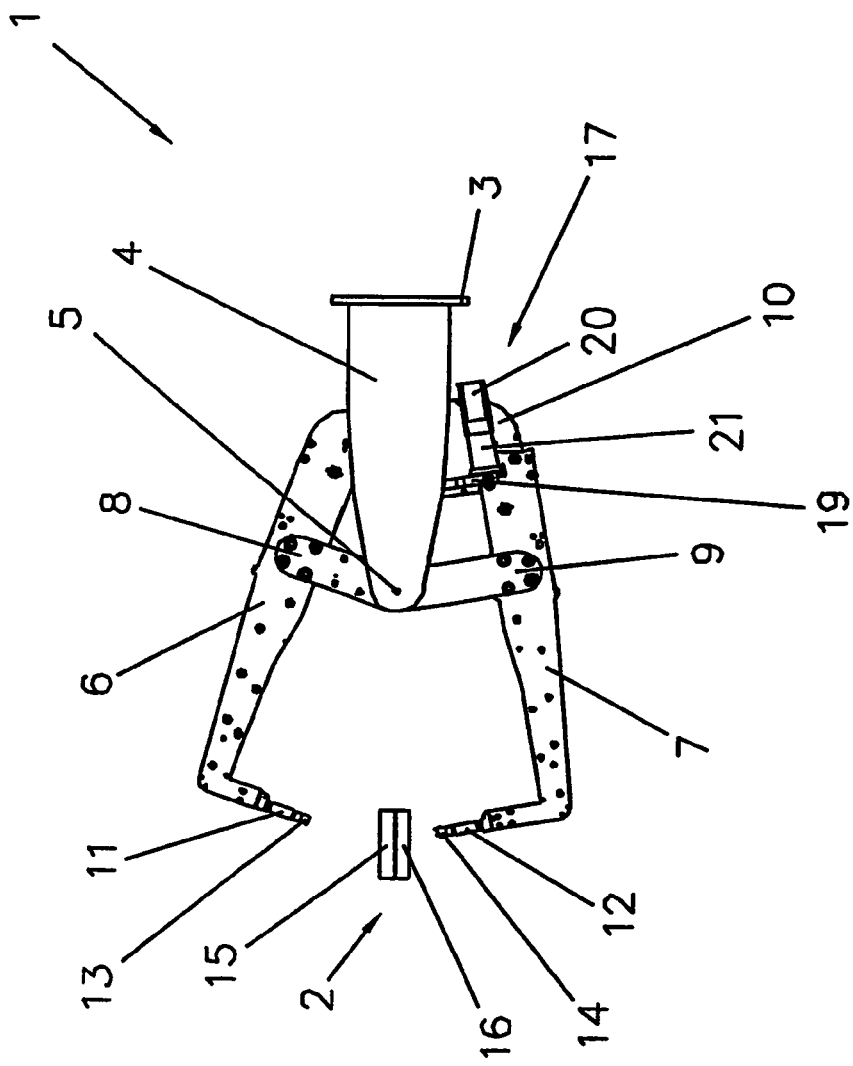
FIG. 2 depicts spot welding tongs according to FIG. 1, positioned at a workpiece.
Figure 3:
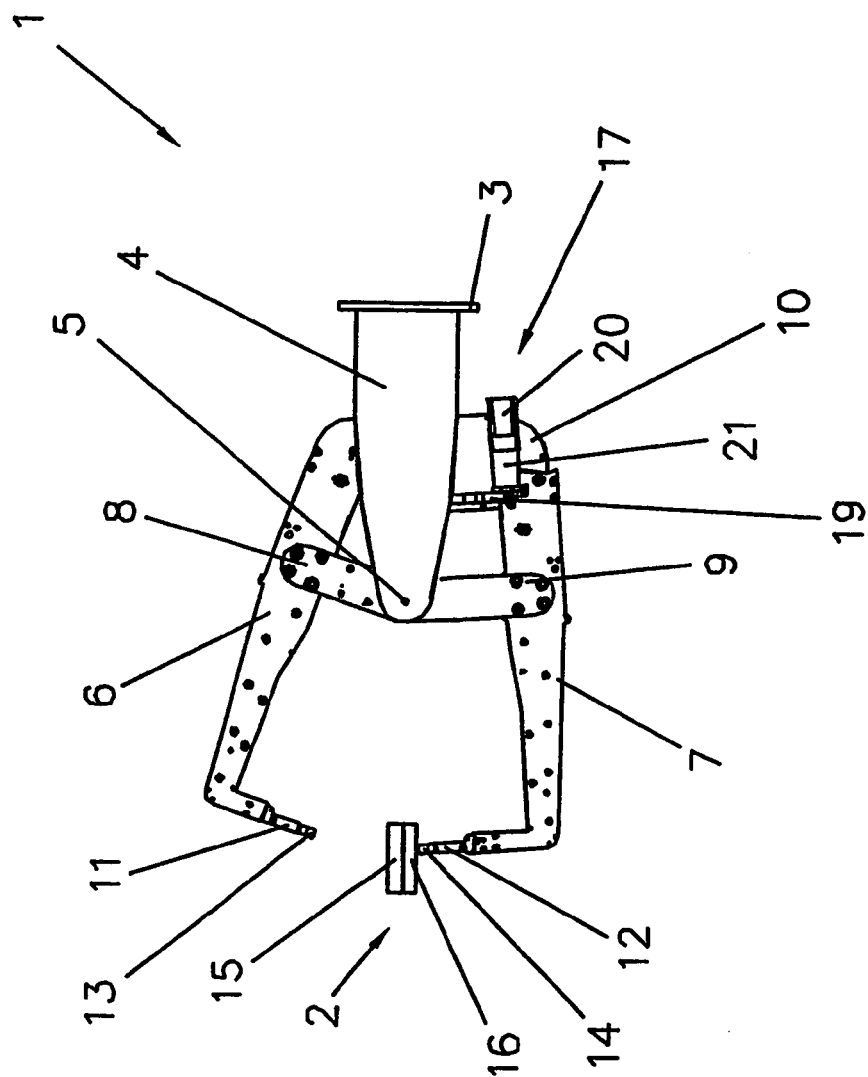
FIG. 3 shows spot welding tongs according to FIG. 1 with a tong arm contacting the workpiece.
Figure 4:
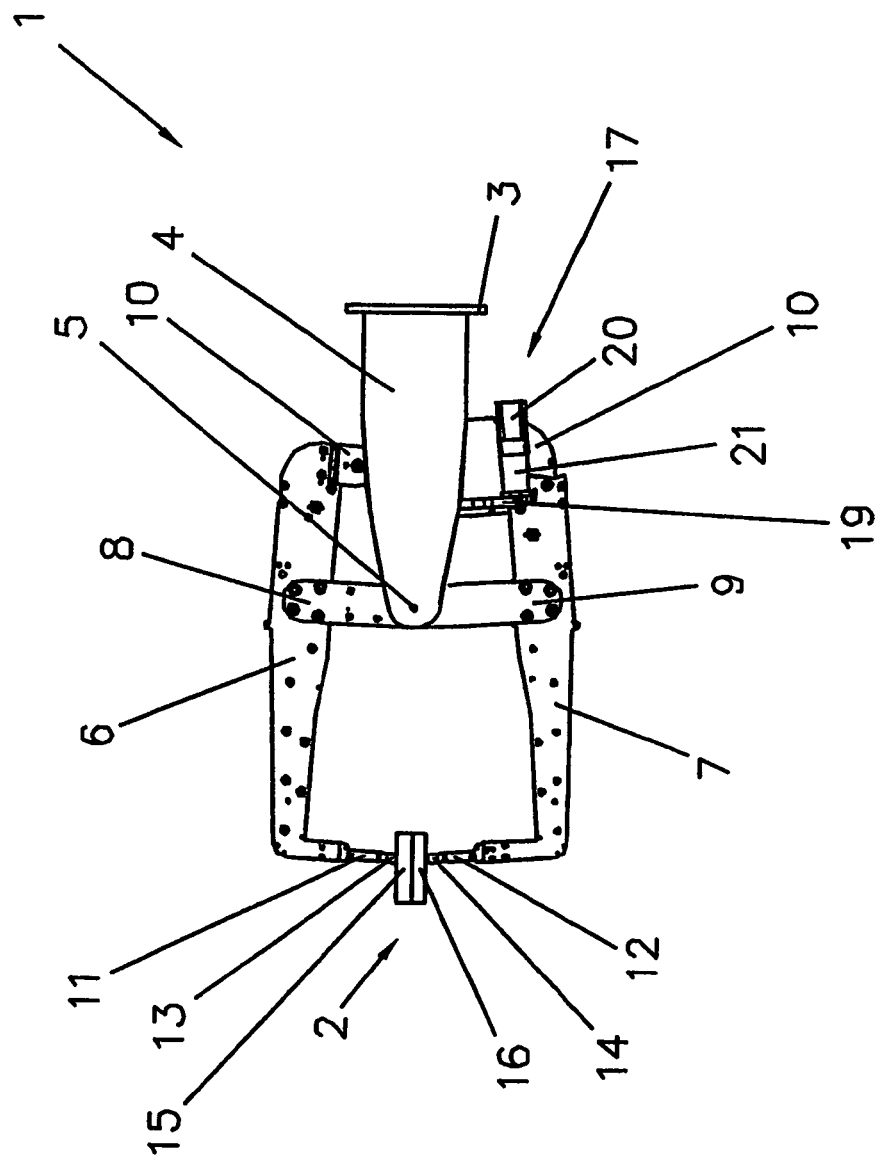
FIG. 4 shows spot welding tongs according to FIG. 1 during the performance of resistance-welding.

During the welding process, the workpiece 2 to be welded is located between the electrodes 13, 14, said workpiece being, for instance, comprised of two components 15, 16. To perform the welding procedure, the spot welding tongs 1 must at first be positioned by the robot. To this end, the spot welding tongs 1 are in the opened state according to FIG. 1, i.e. in a starting position or original position. In FIGS. 2 to 4, the individual operating steps of the spot welding tongs 1 are illustrated until the realization of the resistance welding operation.

Before the robot is able to position the spot welding tongs 1 in a welding position at the prefixed components 15, 16, the tong arms 6, 7 must be sufficiently opened. This is effected by the main drive 10, which moves the tong arms 6, 7 in a basically diametrically opposed manner. The opening of the tong arms 6, 7 takes place while taking into account the shape of the components 15, 16, the tolerance of the components 15, 16 and the positioning accuracy of the robot.

During opening, it will likewise be taken into account that the robot will require a starting point or reference point in order for the tong arms 6, 7 to be brought into the welding position of the workpiece 2 in a contactless manner. The reference point is, for instance, defined on the contact surface of the electrode 14 with the component 16. In order that the contact surface of the electrode 14 will actually include the reference point, the tong arm 7, on which the electrode 14 is mounted, is connected with the tong base body 4 via a compensation unit 17. By appropriately activating the compensation unit 17, which is effected by the controller of the spot welding tongs 1, the tong arm 7, or contact surface of the electrode 14, is kept on the reference point. It is thereby ensured that the spot welding tongs 1 will be maintained at the same location in any possible welding position.

The compensation unit 17, thus, causes the spot welding tongs 1, or tong arms 6, 7, to be constantly held in the same position, particularly during the positioning procedure of the robot. The robot will, thus, be able to readily and, in particular, contactlessly position the spot welding tongs 1, and tong arms 6, 7, in the desired welding position of the components 15, 16.

During the positioning procedure, the reference point, or the contact surface of the electrode 14, is positioned at a defined distance of, for instance, 2 cm below the welding position of the components 15, 16, as is apparent from FIG. 2. At the welding locations, the electrodes 13, 14 are positioned in such a manner as to substantially extend normally to the components 15, 16 to be welded with each other. After positioning has been completed, the robot will send a message to the tong controller to subsequently enable resistance welding. To perform the resistance welding operation at the welding locations of the components 15, 16, the tong arms 6, 7 are moved towards each other. In doing so, there are various options for controlling the compensation unit 17.

According to FIG. 3, resistance-welding is, for instance, performed in that the compensation unit 17 moves the tong arm 7, and the electrode 14, to the component 16 until the electrode 14 contacts the component 16 by a predefined force which is determined via a force sensor or by evaluating the motor current of the compensation unit 17. The tong arm 7 is maintained in this position until the end of the welding procedure by appropriately controlling the compensation unit 17. After this, the main drive 10 moves the tong arm 6, and the electrode 13, to the component 15 until the necessary, predefined pressure is exerted on the components 15, 16 between the electrodes 13, 14, as is apparent from FIG. 4. Subsequently, a defined electric current supplied from a welding apparatus is conducted through the electrodes 13, 14 for performing the resistance welding of the components 15, 16.

It is likewise possible that the resistance welding operation takes place in such a manner that the tong arm 6 is moved to the component 15 by the main drive 10 as far as to a defined distance substantially corresponding to the distance between the electrode 14 and the component 16, i.e., for instance, 2 cm. Subsequently, the compensation unit 17 is deactivated or, for instance, switched currentless, preferably from a predetermined closing angle of the spot welding tongs 1. The tong arms 6, 7 are thereby centered on the workpiece 2, with the main drive 10 exerting the necessary, predefined pressure for carrying out resistance welding. By this type of movement, it is thus reached through the clearing of the compensation unit 17 that the tong arm 6 or 7 engaged by the compensation unit 17 is freely movable so as to ensure the automatic abutment of the electrodes 13, 14 on the components 15, 16.

In a further variant for carrying out resistance welding, the control of the compensation unit 17 is effected in a manner that the latter is, for instance, powered with a predefined current. The current level is chosen such that the spot welding tongs 1 are kept in their position while being movable to a limited extent. This enables the suspension of the compensation movement so as to prevent any deformation of the workpiece 2, or components 15, 16. As described above, the tong arms 6, 7 are again centered on the workpiece 2, with the main drive 10 exerting the necessary, predefined pressure for carrying out resistance welding.

Upon completion of the resistance welding operation, the spot welding tongs 1, or tong arms 6, 7, are returned to their starting positions as in accordance with FIG. 2. It is also possible to return the spot welding tongs 1 into its original position as in accordance with FIG. 1. Furthermore, the spot welding tongs 1 can be moved to the next welding position of the components 15, 16 after having been returned as in accordance with FIG. 1 or FIG. 2.

In accordance with the invention, the compensation unit 17 for performing the described variants of resistance welding is designed such that the compensation unit 17 is comprised of a drive unit 18 and a connector element 19 eccentrically arranged on the drive unit 18. The connector element 19 thus causes the conversion of a rotational movement of the drive unit 18 into a linear movement of a tong arm 6 or 7. The necessary suspension of the compensation movement of the compensation unit 17 is achieved by the appropriate control of the drive unit 18. A simple structure of the compensation unit 17 is thus provided, which will minimize maintenance expenditures.

A setup of the compensation unit 17 according to the invention is apparent from FIG. 5. FIGS. 6 and 7 depict the compensation unit 17 in different positions for compensation movements.

The drive unit 18 of the compensation unit 17 substantially comprises an electric motor 20 and a gear 21, preferably a planetary gear. The drive unit 18 and, in particular, the electric motor 20 performs a rotational movement via a shaft 22, which rotational movement is converted into a linear movement via the connector element 19. To this end, an eccentric disc 23 is fastened to the shaft 22 and mounted accordingly. The eccentric disc 23, via a recess 24 provided in its center, is fastened to the shaft 22 in a rotationally fast manner by the aid of a fastening means 25 formed, for instance, by a screw and a disc. The eccentric disc 23 is, thus, rotated in correspondence with the shaft 22. Furthermore, a lever 26 is arranged on the eccentric disc 23, which lever comprises a bore 27 for fastening the connector element 19. The eccentric arrangement of the bore 27 on the eccentric disc 23 causes the conversion of the rotational movement of the eccentric disc 23 into a linear movement via the connector element 19 fastened to the bore 27, i.e. of the compensation movement.

As is apparent from FIGS. 6 and 7, a range of rotation 28 of, for instance, 90° of the eccentric disc 23, and lever 26, will substantially do for the compensation movement. In a preferred manner, the range of rotation 28 is between the 270° position of the lever 23, i.e. a lower end position 29 perpendicularly below the recess 24, and the 360° position of the lever 26, i.e. an upper end position 30 horizontally of the recess 24. In order to enable the connector element 19 to convert this rotational movement into a linear movement, the former is shaped accordingly. The connector element 19, thus, comprises two shapes. The end region that is fastened to the lever 26 is curved to substantially correspond with the eccentric disc 23, wherein a bore 31 is provided. Said bore 31 serves to rotationally fasten the connector element 19 to the bore 27 of the lever 26 via a pin 32. To this end, the curved end region of the connector element 19 includes a recess which is configured in correspondence with the lever 26. The curved end region of the connector element 19, thus, encloses the lever 26. The end region located opposite the curved end region, of the connector element 19 is designed as a web 33. The web 33, for instance, serves for the movable attachment to the tong base body 4. In a preferred manner, the movable attachment of the web 33 is realized by the aid of an eyebolt 34 or a connecting rod detachably connected to the web 33, for instance, by a thread. By that thread, also the adjustment of the distance will be feasible. To fasten the eyebolt 34 to the web 33, the latter comprises an internal thread, wherein a nut 35 is additionally used for fixation as a so-called counter-nut. Such a configuration of the compensation unit 17 enables the conversion of the rotational movement of the drive unit 18, and the eccentric disc 23 fastened to the shaft 22, into a linear movement via the connector element 19 rotationally mounted on, and fastened to, the lever 26. To this end, the drive unit 18 is, for instance, mounted to the tong arm 7 and the eyebolt 34 connected with the web 33 of the connector element 19 is fastened to the tong base body 4. Similarly, the drive unit 18 may be fastened to the tong arm 6, or the eyebolt 34 may be fastened to one of the tong arms 6, 7 and the drive unit 18 to the tong base body 4 in a corresponding manner. This will ensure the required compensation movements irrespective of the arrangement of the compensation unit 17.

The compensation movement of the tong arm 7 is effected by the lifting or lowering of the drive unit 18, which is mounted in the longitudinal axis of the tong arm 7. The eyebolt 34, thus, constitutes a stationary, yet rotatable pivot for the compensation unit 17.

In order that the lifting and lowering of the tong arms 6, 7 by the compensation unit 17 be effected at an expenditure of force as low as possible of the electric motor 20, an adjustment of the compensation unit 17 is required. The lowest expenditure of force for the electric motor 20 is substantially provided in the range of rotation 28. It is, therefore, advantageous that the rotational movement of the electric motor 20, and the lever 26, for the compensation movement, i.e. from the reference point until contacting the component 16, takes place within the range of rotation 28.

The reference point is required by the robot for the positioning of the spot welding tongs 1, said reference point, for instance, constituting the contact surface of the electrode 14 as already known. From the reference point results a position of the tong arm 7, to which the drive unit 18 is fastened, for instance via an angle bracket 36 which may be comprised of several parts. From this results the length for the connector element 19, which length is adjusted via the thread of the eyebolt 34 and the internal thread provided in the web 33, respectively. The correct length has been adjusted when the curved end region of the connector element 19 can be fastened to the lever 26 in the region of the upper end position 30 on the lever 26. To fasten the bore 31 to the bore 27, the eccentric disc 23 is accordingly fixed to the shaft 22, or accordingly positioned by the appropriate control of the electric motor 20. For the reference point, the position of the lever 26 is, for instance, near the upper end position 30, as is apparent from FIG. 6. It is likewise feasible for the reference point that the position of the lever 26 is in the central region of the range of rotation 28.

Upon completion of the compensation movement, i.e. as the component 16 is contacted by the contact surface of the electrode 14, a position of the lever 26 has thus resulted in the central region of the range of rotation 28, as illustrated in FIG. 7. A position of the lever 26 near the lower end position 29 of the range of rotation 28 may also result after the compensation movement, as a function of the position of the lever 26 for the reference point.

After the adjustment of the compensation unit 17, i.e. as the lever 26 is moving in the range of rotation 28, resistance welding is feasible. By said adjustment, the reference point too will be defined and made known to the control of the robot. The controller of the robot, in turn, is associated with a controller of the spot welding tongs 1 and the compensation unit 17, i.e. the tong controller, and a controller of the welding apparatus.

The robot is, thus, able to position the spot welding tongs 1 at the welding position of the components 15, 16 for resistance welding. After this, the drive unit 18, and the electric motor 20, are initially controlled in a manner that the lever 26 will move in the direction of the lower end position 29 within the range of rotation 28, as is apparent from FIG. 7, thus carrying out the compensation movement. The tong arm 7, and the electrode 14, are thus moved to the component 16 as already described in respect to FIG. 3, since the web 33 of the connector element 19 is stationarily fastened to the tong base body 4 via the eyebolt 34 and the drive unit 18 is mounted to the tong arm 7. The compensation movement according to FIG. 3 may also be effected in that the tong arm 7 is applied at the component 16 by a predefined force. To this end, a force measuring sensor or a strain gauge is, for instance, provided in the region of the web 33. This will then transmit a signal to the tong controller once the predefined force has been reached. It is also possible to perform the compensation movement in a manner that the curved end region of the connector element 19 abuts on the eccentric disc 23. This is achieved in that the connector element 19 moves to the eccentric disc 23 during the compensation movement. In order that the abutment of the connector element 19 on the eccentric disc 23 occurs in a defined manner, a screw may, for instance, be provided above the lever 26 or, correspondingly, on the connector element 19. A turn of the screw will enable the adjustment of the abutment and, hence, position of the electrode 14. Resistance welding can, thus, be carried out by the main drive 10 closing the tong arms 6, 7 by a predefined welding force. After the completion of the resistance welding operation of the components 15, 16 as already described by way of FIG. 4, the tong arm 7 is opened by the main drive 10. After this, the lever 26, and the contact surface of the electrode 14, are again positioned and held on the reference point by the appropriate control of the drive unit 18. The robot will thus be able to position the spot welding tongs 1 in the next welding position in order to perform the respective resistance welding operation.

Such a configuration of the compensation unit 17 and its positioning or adjustment on the spot welding tongs 1 result in a short distance for the compensation movement within the range of rotation 28. Hence results a minimum expenditure of force for the drive unit 18.

The expenditure of force for the electric motor 20 can be additionally minimized by using a gear 21. In this case, the drive unit 18 is configured such that the rotational movement of the electric motor 18 will be accordingly translated by the gear 21 and the eccentric disc 23 will be accordingly rotated by the gear 21.

A reduction of the expenditure of force for the electric motor 20 for performing the compensation movement will, however, also ensure a minimization of the thermal load on the electric motor 20. Thus, also the lifespan of the electric motor 20, and the overall drive unit 18, will be increased.

The compensation unit 17 according to the invention, for the spot welding tongs 1 can be used with any configuration of the spot welding tongs 1. Thus, for instance, also for a C-shaped spot welding tongs 1, or C-spot welding tongs. To enable the compensation unit 17 to be used with different spot welding tongs embodiments, it is feasible to accordingly adapt the shape of the connector element 19. The connector element 19 may, for instance, be web-shaped, with the shape of the eccentric disc 23 being adapted accordingly.

The invention claimed is:

1. Spot welding tongs with tong compensation, comprising:
   a) a tong base body,
   b) two tong arms, and
   c) wherein said tong base body is designed to convert a rotational movement into a linear movement,
   d) a compensation unit movably connecting one of said two tong arms, said compensation unit comprising:
      i) a drive unit; and
      ii) a rotatable eccentric disc having a limited range of rotation;
      iii) a connector element, wherein said connector element is eccentrically and movably coupled to said rotatable eccentric disc and coupled to said drive unit, wherein said connector element is designed to be curved in an end region around said rotatable eccentric disc wherein a portion of said rotatable eccentric disc is designed as a lever including a bore for fixing the connector element wherein said compensation unit in combination with said tong base body is configured to convert a rotational movement into a linear movement to maintain the spot welding tongs in a same location in any possible welding position.

2. Spot welding tongs according to claim 1, wherein the eccentric disc comprises a recess provided in its center for the rotationally fast fixation to the drive unit.

3. Spot welding tongs according to claim 1, wherein said connector element, in the end region located opposite the curved end region, is designed as a web and comprises a fastening element for a stationary and a movable fixation.

4. Spot welding tongs according to claim 3, wherein said fastening element is designed as an eyebolt.

5. Spot welding tongs according to claim 4, wherein said eyebolt is detachably fastened to the connector element.

6. Spot welding tongs according to claim 1, wherein said drive unit is arranged on said tong base body.

7. Spot welding tongs according to claim 1, wherein said drive unit is arranged on one of said tong arms.

8. Spot welding tongs according to claim 1, wherein said drive unit is comprised of an electric motor.

9. Spot welding tongs according to claim 1, wherein said drive unit is comprised of an electric motor and a gear.

10. Spot welding tongs according to claim 1, further comprising a control unit wherein said drive unit is connected with said control unit.

11. Spot welding tongs according to claim 10, wherein said control unit is integrated in a controller for the spot welding tongs.

12. Spot welding tongs according to claim 1, further comprising a measuring element is arranged on the connector element in the region of the web and connected with the control unit.

13. Spot welding tongs according to claim 12, wherein said measuring element is formed by a force measuring sensor.

14. Spot welding tongs according to claim 12, wherein said measuring element is formed by a strain gauge.

15. The spot welding tongs as in claim 1, wherein said eccentric disc is configured to rotate at least 90 degrees.

16. The spot welding tongs as in claim 1, wherein said eccentric disc is configured to rotate at least 270 degrees.

17. The spot welding tongs as in claim 1, wherein said bore is arranged in an eccentric manner on said eccentric disc such that rotational movement of said eccentric disc translates into linear movement of said connector element.

18. The spot welding tongs as in claim 1, wherein the range of rotation of the rotatable eccentric disc is 90 degrees.

19. The spot welding tongs as in claim 1, wherein the rotatable eccentric disc has a recess and the range of rotation of the rotatable eccentric disc is from a lower end position perpendicularly below said recess, and a, position of the lever and an upper end position horizontally even with said recess.

* * * * *